United States Patent
Ikegami et al.

(10) Patent No.: US 10,371,847 B2
(45) Date of Patent: Aug. 6, 2019

(54) SYSTEM AND METHODOLOGY FOR IDENTIFYING TIME DIFFERENCES BETWEEN CLOCKS DURING SEISMIC EXPLORATION

(71) Applicant: Schlumberger Technology Corporation, Sugar Land, TX (US)

(72) Inventors: Toru Ikegami, Machida (JP); Shinji Yoneshima, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 570 days.

(21) Appl. No.: 14/849,517

(22) Filed: Sep. 9, 2015

(65) Prior Publication Data

US 2016/0091625 A1 Mar. 31, 2016

Related U.S. Application Data

(60) Provisional application No. 62/056,615, filed on Sep. 29, 2014.

(51) Int. Cl.
*G01V 1/40* (2006.01)

(52) U.S. Cl.
CPC ............ *G01V 1/40* (2013.01); *G01V 2200/12* (2013.01)

(58) Field of Classification Search
CPC ............................. G01V 1/40; G01V 2200/12
See application file for complete search history.

(56) References Cited

U.S. PATENT DOCUMENTS

| | | | |
|---|---|---|---|
| 6,131,694 A | 10/2000 | Robbins et al. | |
| 6,400,646 B1 | 6/2002 | Shah et al. | |
| 6,912,465 B2 * | 6/2005 | Collins | G01V 1/26 702/11 |
| 6,969,819 B1 | 11/2005 | Griffin | |
| 7,710,822 B2 | 5/2010 | Harmon | |
| 7,969,819 B2 | 6/2011 | Hall et al. | |
| 8,069,932 B2 | 12/2011 | Kamata | |
| 8,995,222 B2 * | 3/2015 | Xia | G01V 1/3817 367/127 |
| 2008/0137474 A1 | 6/2008 | Dashevskiy et al. | |
| 2012/0294112 A1 * | 11/2012 | Pearce | G01V 1/38 367/2 |

\* cited by examiner

*Primary Examiner* — Krystine E Breier

(57) ABSTRACT

A technique facilitates seismic exploration by identifying time differences between clocks employed during the seismic exploration. According to an embodiment, a seismic signal is output from a source and has an incident wave and a reflected wave. The seismic signal is received by at least one receiver which outputs data to a control system. The control system is employed to compare a symmetry of the propagation of the incident wave and the reflected wave. The symmetry data is then used to determine a temporal change of the time base of the at least one receiver.

20 Claims, 4 Drawing Sheets

SYSTEM AND METHODOLOGY FOR IDENTIFYING TIME DIFFERENCES BETWEEN CLOCKS DURING SEISMIC EXPLORATION

CROSS REFERENCE TO RELATED APPLICATIONS

This is a non-provisional patent application of U.S. provisional patent application No. 62/056,615, filed on Sep. 29, 2014 which is hereby incorporated in its entirety for all intents and purposes by this reference.

BACKGROUND

Seismic exploration services are employed in a wide variety of environments to locate hydrocarbon fluids. Hydrocarbon fluids such as oil and natural gas are obtained from a subterranean geologic formation, referred to as a reservoir, by drilling a well that penetrates the hydrocarbon-bearing formation. Knowing where the reservoir is located and/or the type of geological formation containing the reservoir is valuable in determining where to drill and in deciding what well servicing treatments may be desired to efficiently produce a reservoir. One method of mapping the area around a borehole uses seismic source signals and seismic receivers. The seismic signals, e.g. acoustic signals, are generated by a seismic source or sources, and the signals then travel through the geological formations. The profiles of the seismic signals are altered by the formation prior to being received by the acoustic receivers. By processing the waveforms of the seismic signals detected by the receivers, a representive indication of the location, composition, and extent of various geological formations may be obtained.

SUMMARY

In general, a system and methodology are provided for improving seismic exploration by identifying time differences between clocks employed during the seismic exploration. According to an embodiment, a seismic signal is output from a source and has an incident wave and a reflected wave. The seismic signal is received by at least one receiver which outputs data to a control system. The control system is employed to compare a symmetry of the propagation of the incident wave and the reflected wave. The symmetry data is then used to determine a temporal change of the time-base of the at least one receiver.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
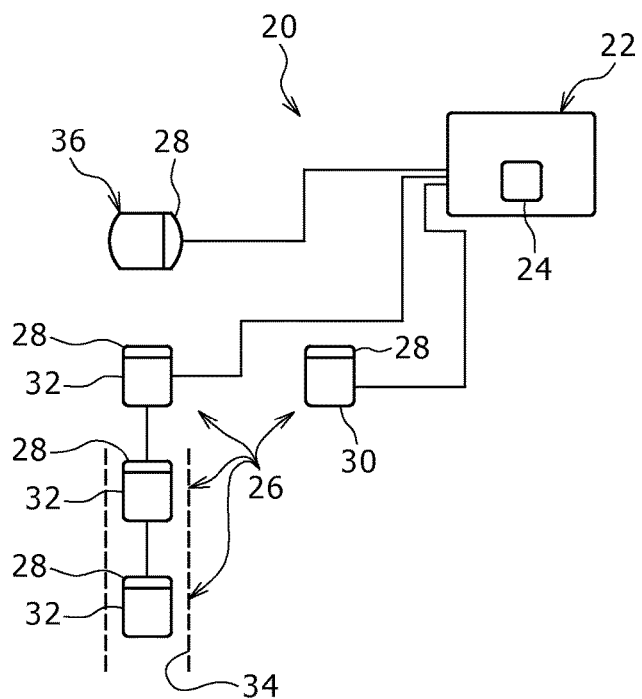
FIG. 1 is a schematic illustration of an example of a seismic system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology to identify time differences between clocks used in downhole seismic exploration services. According to an embodiment, a seismic signal is output from a source and has an incident wave and a reflected wave. The seismic signal is received by at least one receiver which outputs data to a control system. The control system is employed to compare a symmetry of the propagation of the incident wave and the reflected wave. The symmetry data is then used to determine a temporal change of the time-base of clocks of the at least one receiver. Clocks refer to timing established by a plurality of seismic devices, e.g. seismic receivers, and/or to timing established by an individual seismic receiver moved to two different positions, e.g. to two different depths.

In downhole seismic exploration, a seismic signal, e.g. a seismic wave, may be generated at a surface source and then recorded by seismic receivers. The seismic receivers may be placed at surface locations and at downhole locations to enable construction of a set of waveforms which are processed by a control system to obtain subsurface geophysical information. For data processing, an assumption often is made that the waveforms are recorded on the same time-base but this is not necessarily true when, for example, there is no electrical connection between the receivers. For example, there may be no electrical connection between downhole seismic receivers and surface seismic receivers. The methodology described herein enables determination of the occurrence of inconsistencies of the time-base, e.g. time shifts, among the clocks used in the seismic receivers by examining data obtained from the seismic receivers via, for example, a control system. The methodology also enables correction of the data to compensate for such inconsistencies of the time-base. In some applications, the inconsistencies of the time-base occur among the clocks in at least one surface receiver and at least one downhole receiver.

An example of the seismic system in which inconsistencies in the time-base among the clocks can occur comprises a seismic system in which measurements are made with Seismic Measurement While Drilling (SMWD) tools. These types of tools have their own clock to govern the time-base of the seismic acquisition system. However, the clock of the SMWD tool cannot be synchronized to a surface system GPS clock once the tool is moved downhole into a borehole. If there is substantial clock drift, the time-base associated with the data acquired at each depth along the borehole becomes inconsistent and this inconsistency is in addition to the inconsistency which may occur between the clock of the SMWD tool and the clock of the surface system GPS. The present methodology enables determination of the occurrence of such inconsistencies of the time-base between the clocks, e.g. between the clocks used in surface receivers and downhole receivers, by examining the obtained data. The methodology is based on the fact that the incident waves and reflected waves of the seismic signals appear in a symmetric manner in the seismic data if the time-bases of the seismic receivers are the same.

Referring generally to FIG. 1, an example of a seismic system 20 is illustrated. In this example, seismic system 20 comprises a control system 22 which may be in the form of a computer-based control system having a processor 24. Processor 24 may be constructed and/or programmed for processing seismic data according to desired algorithms, models, and/or other suitable programs to determine, for example, the location, composition, and/or extent of various geologic formations. A plurality of seismic receivers 26 is operatively coupled with the control system 22 and each seismic receiver comprises a timing or clocking mechanism 28. By way of example, the plurality of seismic receivers 26 may comprise at least one surface receiver 30 positioned on a surface of the earth and at least one subterranean receiver 32 positioned, for example, downhole in a borehole 34. The seismic system 20 further comprises at least one seismic source 36 operatively coupled with the control system 22 and positioned to output a seismic signal which is detected by the plurality of seismic receivers 26. The seismic source 36 may be positioned at a surface location and/or at a downhole location and also may comprise timing or clocking mechanism 28.

Figure 2:
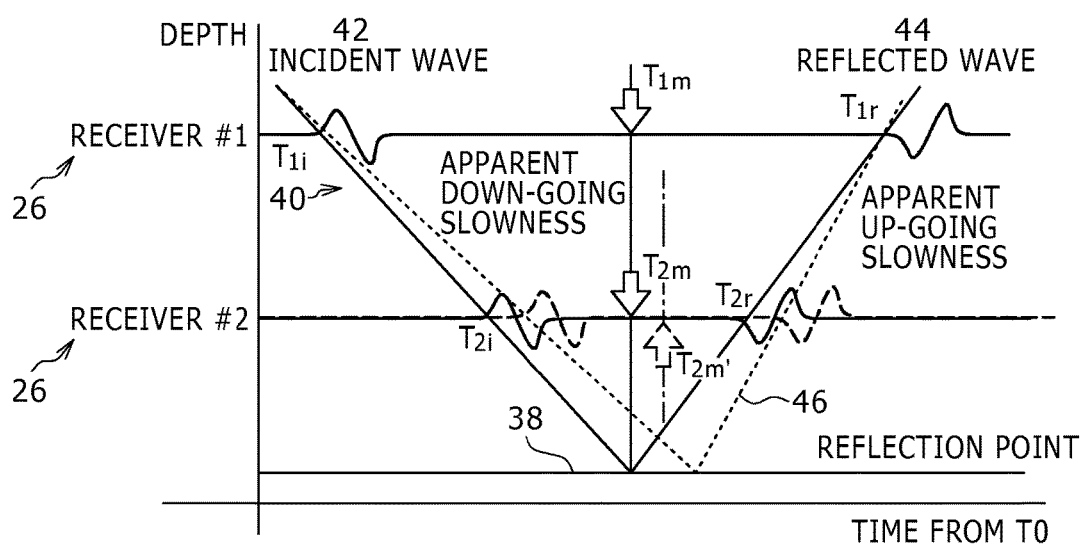
FIG. 2 is a graphical illustration of a methodology for finding inconsistency of the time-base between clocks of seismic devices, e.g. clocks/timing of different seismic receivers or clocks/timing of an individual seismic receiver moved to different locations, according to an embodiment of the disclosure.

Referring generally to FIG. 2, a diagrammatic illustration is provided to enhance explanation of an embodiment of the methodology for finding inconsistencies of the time-base between clocks of different seismic devices, e.g. different seismic receivers 26. In this example, it can be assumed there are two seismic receivers 26 (Receiver #1 and Receiver #2) located at different depths between the source 36 and a reflection point, labeled with reference 38 in FIG. 2. The reflection point may result from a variety of geological features or well related features creating an acoustic impedance mismatch that reflects the seismic signal, e.g. a seismic/acoustic wave. A reflection point can be, but is not limited to, a formation boundary, a sea bottom, a bottom of the well, a bottom of the casing, a casing shoe, and other features.

In this particular example, the source 36 is located above the seismic receivers 26 and the reflection point 38 is below the receivers 26. When the seismic source 36 emits the seismic signal, the seismic signal comprises a seismic wave 40 having an incident wave 42 and a reflected wave 44 which are recorded at each receiver 26. For purposes of explanation, the arrival times of the incident wave 42 recorded at receiver #1 and receiver #2 are labeled $T_{1i}$ and $T_{2i}$, respectively. The corresponding arrival times of the reflected wave 44 recorded at receiver #1 and receiver #2 are labeled $T_{1r}$ and $T_{2r}$, respectively.

By comparing the midpoint of the arrival times at the receiver #1, $T_{1m}=(T_{1i}+T_{1r})/2$, and that of the receiver #2, $T_{2m}=(T_{2i}+T_{2r})/2$, the difference of the time-base among the clocks 28 of those receivers can be identified. If the time-bases of these two receivers are synchronized, the middle point of the receiver #1 ($T_{1m}$) and that of the receiver #2 ($T_{2m}$) should be equal. If there is certain time shift between the clocks 28, as shown by the dashed line 46 in FIG. 2, the midpoints disagree and the difference is the inconsistency in (or shift of) the time-base.

The present methodology may be implemented according to several procedural embodiments to determine the inconsistencies with respect to the time-base and to compensate for those inconsistencies. According to an embodiment, the methodology is implemented using the arrival times T discussed above with reference to FIG. 2. The embodiment of the methodology is illustrated by the flow chart of FIG. 3.

Figure 3:
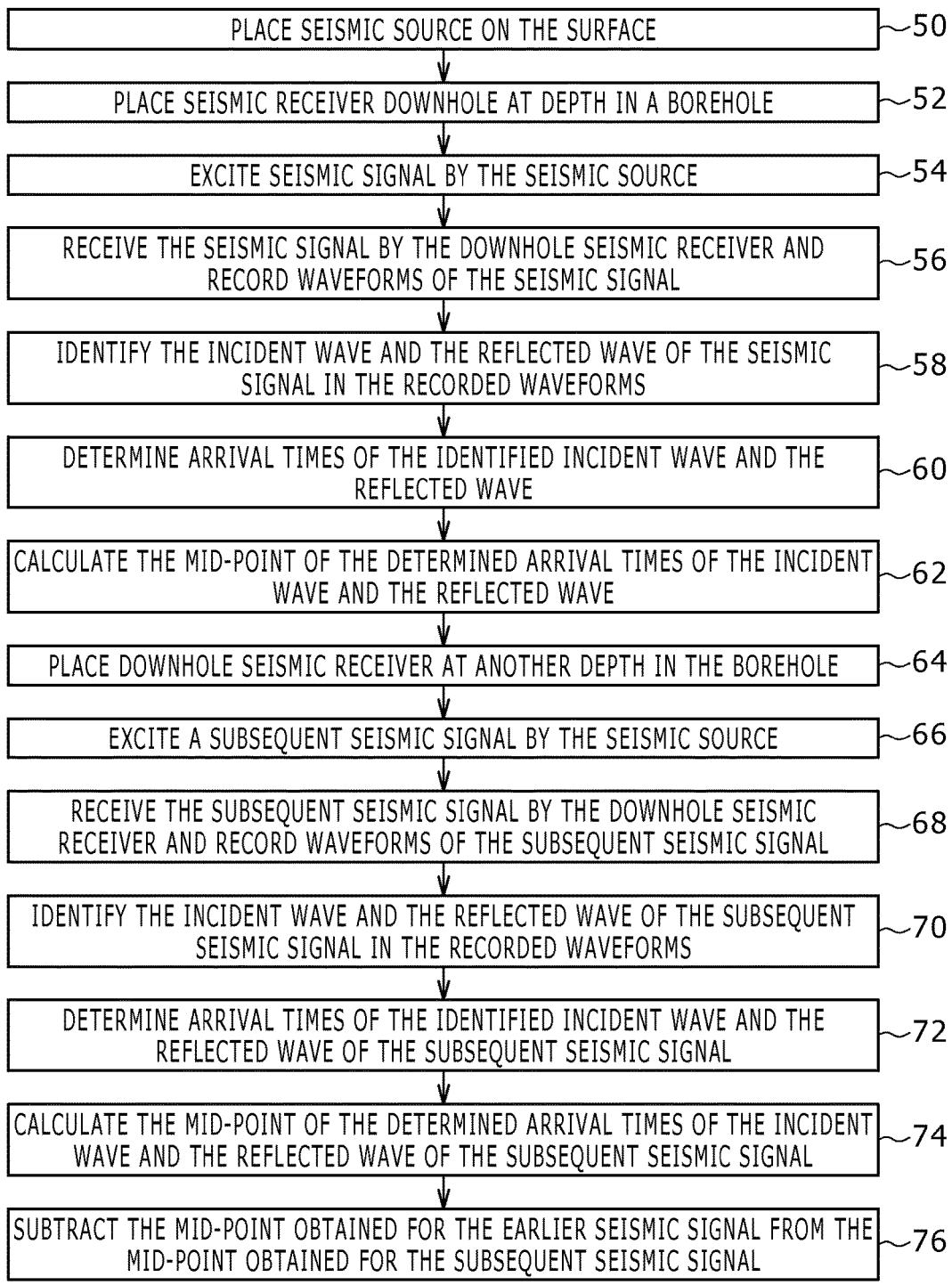
FIG. 3 is a flowchart illustrating an example of a procedure for determining inconsistency of the time-base of clocks for a corresponding seismic device, according to an embodiment of the disclosure.

Referring generally to the example illustrated in FIG. 3, at least one seismic source 36 is placed on the surface of the earth at a selected surface location, as represented by block 50. Additionally, at least one seismic receiver 26 is located downhole in borehole 34 at a desired depth, as represented by block 52. The at least one seismic receiver 26 can be located at the desired depth simultaneously with, after or before placement of the at least one seismic source 36. The seismic signal/wave 40 is then excited and output by the seismic source 36, as represented by block 54. The seismic signal 40 is received by the downhole seismic receiver 26 and the waveform of the seismic signal is recorded at, for example, control system 22, as represented by block 56. The incident wave 42 and the reflected wave 44 of the seismic signal are then identified in the recorded waveforms, as represented by block 58.

The control system 22 and processor 24 may be used to process the data received from seismic receiver 26 so as to determine arrival times of the identified incident wave 42 and reflected wave 44, as represented by block 60. The data may be further processed to calculate the mid-point of the determined arrival times of the incident wave 42 and the reflected wave 44, as represented by block 62.

The seismic receiver 26 is then moved along the borehole 34 and placed at another depth, as represented by block 64. A subsequent seismic signal is excited and output by the seismic source 36, as represented by block 66. The subsequent seismic signal is again received by the downhole seismic receiver 26 and the waveform of the subsequent seismic signal is recorded at, for example, control system 22, as represented by block 68. The incident wave 42 and the reflected wave 44 of the subsequent seismic signal are then identified in the recorded waveform, as represented by block 70.

The control system 22 and processor 24 may again be used to process the data received from seismic receiver 26 so as to determine arrival times of the identified incident wave 42 and reflected wave 44 of the subsequent seismic signal, as represented by block 72. The data may be further processed to calculate the mid-point of the determined arrival times of the incident wave 42 and the reflected wave 44 of the subsequent seismic signal, as represented by block 74. The inconsistency or time shift between the clocks 28 (e.g. the clock 28 of seismic receiver 26 at two different depths) may then be determined via control system 22 by subtracting the mid-point obtained from the earlier seismic signal from the mid-point obtained from the subsequent seismic signal, as represented by block 76. The determination of the time shift may be used by control system 22 to correct for the actual data obtained and relayed to the control system 22 by seismic receiver 26. This methodology also may be employed to determine the time shift between clocks 28 of a plurality of seismic receivers 26 positioned at fixed depths.

According to another embodiment, the methodology is implemented by comparing the apparent slowness of the incident wave 42 with that of the reflected wave 44 (see FIG. 2). If there is no difference in the time-base, the apparent velocity observed for the incident wave 42 should be the same as that for the reflected wave 44 but the velocities are different if there is a time shift between the clocks of a seismic receiver moved between positions or between different seismic receivers. This embodiment of the methodology is illustrated by the flow chart of FIG. 4.

Figure 4:
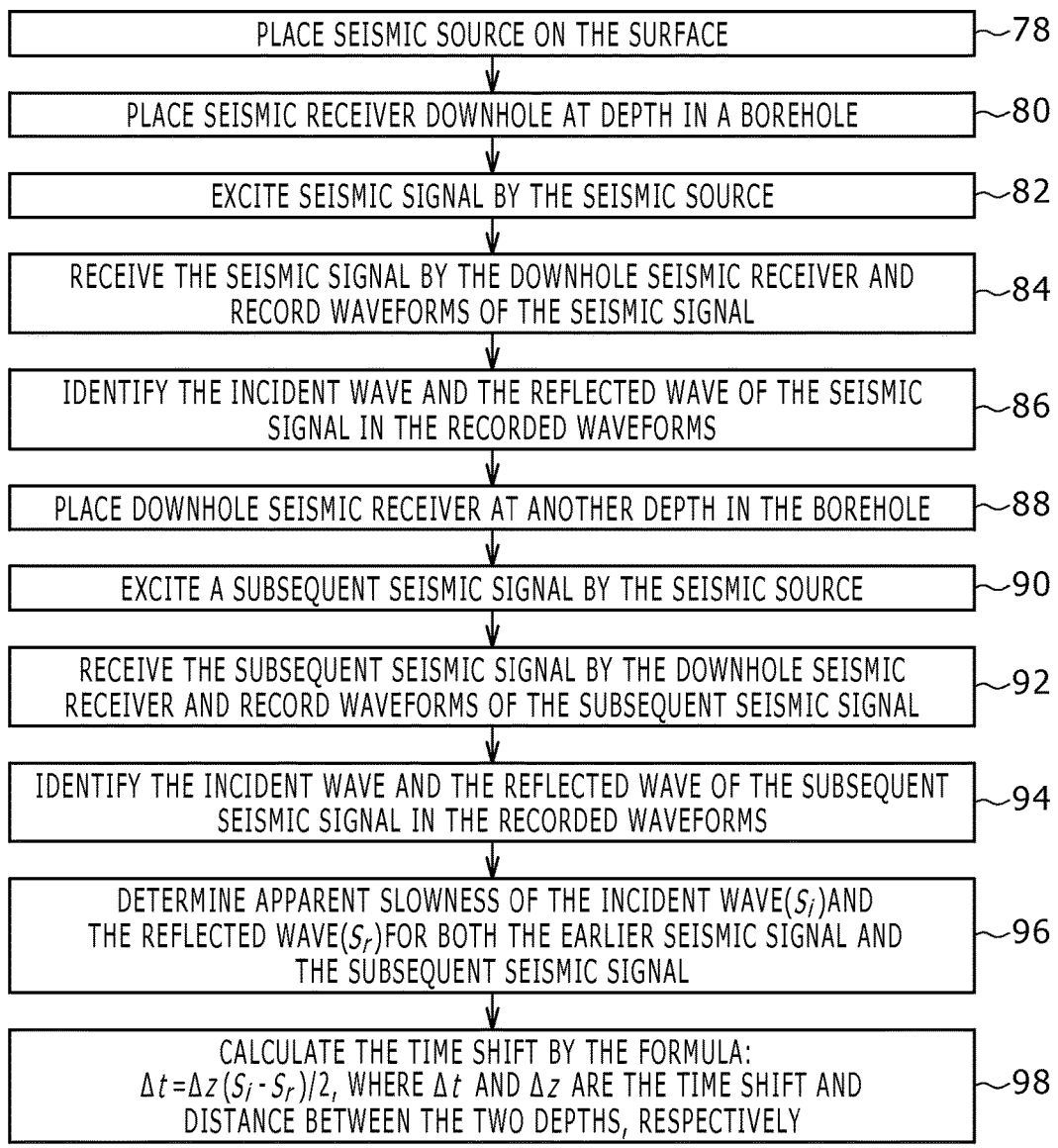
FIG. 4 is a flowchart illustrating another example of a procedure for determining inconsistency of the time-base of clocks for a corresponding seismic device, according to an embodiment of the disclosure.

Referring generally to the example illustrated in FIG. 4, at least one seismic source 36 is placed on the surface of the earth at a selected surface location, as represented by block 78. Additionally, at least one seismic receiver 26 is located downhole in borehole 34 at a desired depth, as represented by block 80. The seismic signal/wave 40 is then excited and output by the seismic source 36, as represented by block 82. The seismic signal 40 is received by the downhole seismic receiver 26 and the waveform of the seismic signal is recorded at, for example, control system 22, as represented by block 84. The incident wave 42 and the reflected wave 44 of the seismic signal are then identified in the recorded waveforms, as represented by block 86.

The seismic receiver 26 is then moved along the borehole 34 and placed at another depth, as represented by block 88. A subsequent seismic signal is excited and output by the seismic source 36, as represented by block 90. The subsequent seismic signal is again received by the downhole seismic receiver 26 and the waveform of the subsequent seismic signal is recorded at, for example, control system 22, as represented by block 92. The incident wave 42 and the reflected wave 44 of the subsequent seismic signal are then identified in the recorded waveform, as represented by block 94.

Based on the acquired data, the control system 22 and processor 24 may again be used to determine an apparent slowness of the incident wave 42 ($S_i$) and the reflected wave 44 ($S_r$) for both the earlier seismic signal and the subsequent seismic signal, as represented by block 96. The control system 22 may then be used to calculate a time shift by the formula: $\Delta t = \Delta z (S_i - S_r)/2$, where $\Delta t$ and $\Delta z$ are the time shift and distance between the two depths, respectively, as represented by block 98. The determination of the time shift may again be used to correct for the actual data obtained and relayed to the control system 22 by seismic receiver 26. This methodology also may be employed to determine the time shift between clocks 28 of a plurality of seismic receivers 26 positioned at fixed depths.

According to another embodiment, the methodology is implemented by taking cross-correlation between received waveforms and time-reversed waveforms. This embodiment is useful when, for example, the incident wave 42 and the reflected wave 44 overwrap each other and are difficult to separate. In this example, the methodology may be carried out by letting $f_o(t)$ represent the wave-packet corresponding to the source signature, and letting $f_1(t)$ and $f_2(t)$ represent the signal received at depth 1 ($z_1$) and depth 2 ($z_2$), where the depth of the reflection point is $z=0$.

Then, the wave recorded at each depth can be written as follows:

$$f_1(t) = f_o(t) + r f_o(t - \tau_1) \quad (1)$$

$$f_2(t) = f_o\left(t - \delta - \frac{\Delta z}{c}\right) + r f_o\left(t - \delta - \frac{\Delta z}{c} - \tau_2\right)$$

Here, $\tau_1$, $\tau_2$ are the two-way time measured at the receiver #1 and #2, respectively; $\delta$ is the shift of the clock of receiver #2 with respect to the clock of receiver #1; $\Delta z = z_1 - z_2$ ($z_1 > z_2$) is the distance between the depth 2 and depth 1; r is the reflectivity at the reflection point; and c is the apparent velocity of the seismic wave. The Fourier transform of these waveforms can be written as:

$$F_1(\omega) = F_o(\omega) + r F_o(\omega) e^{-i\omega \tau_1} \quad (2)$$

$$F_2(\omega) = F_o(\omega) e^{-i\omega\left(\delta + \frac{\Delta z}{c}\right)} + r F_o(\omega) e^{-i\omega\left(\delta + \frac{\Delta z}{c} + \tau_2\right)}.$$

Assuming that we record the data for the time interval $0<t<T$, the time-reversed waveforms for each receiver are:

$$\overline{f}_1(t) = f_o(T - t) + r f_o(T - (t - \tau_1)) \quad (3)$$

$$\overline{f}_2(t) = f_o\left(T - \left(t - \delta - \frac{\Delta z}{c}\right)\right) + r f_o\left(T - \left(t - \delta - \frac{\Delta z}{c} - \tau_2\right)\right).$$

Again, the Fourier transform of these time reversed waveforms become:

$$\overline{F}_1(\omega) = F_o(-\omega) e^{i\omega T} + r F_o(-\omega) e^{i\omega(T + \tau_1)} \quad (4)$$

$$\overline{F}_2(\omega) = F_o(-\omega) e^{i\omega\left(T + \delta + \frac{\Delta z}{c}\right)} + r F_o(-\omega) e^{i\omega\left(T + \delta + \frac{\Delta z}{c} + \tau_2\right)}.$$

Then, the cross-spectrum between the waveform recorded at the receiver #1 and its time-reversal yields:

$$S_1(\omega) = F_1(\omega)(\overline{F}_1(\omega))^* = F_o(\omega)^2 e^{-i\omega T}\left(1 + r e^{-i\omega\left(\frac{2z_1}{c}\right)}\right)^2, \quad (5)$$

and the same for the receiver #2 becomes:

$$S_2(\omega) = F_2(\omega)(\overline{F}_2(\omega))^* = F_o(\omega)^2 e^{-i\omega(T+\delta)} e^{-i\omega \frac{2\Delta z}{c}}\left(1 + r e^{-i\omega\left(\frac{2z_2}{c}\right)}\right)^2. \quad (6)$$

Therefore:

$$S_2(\omega) = S_1(\omega) e^{-i\omega \delta} e^{-i\omega \frac{\Delta z}{c}} \left(\frac{1 + r e^{-i\omega \tau_2}}{1 + r e^{-i\omega \tau_1}}\right)^2. \quad (7)$$

In the above expression, the unknown factors are $\delta$, c, and r, which can be determined with optimization algorithms.

Figure 5:
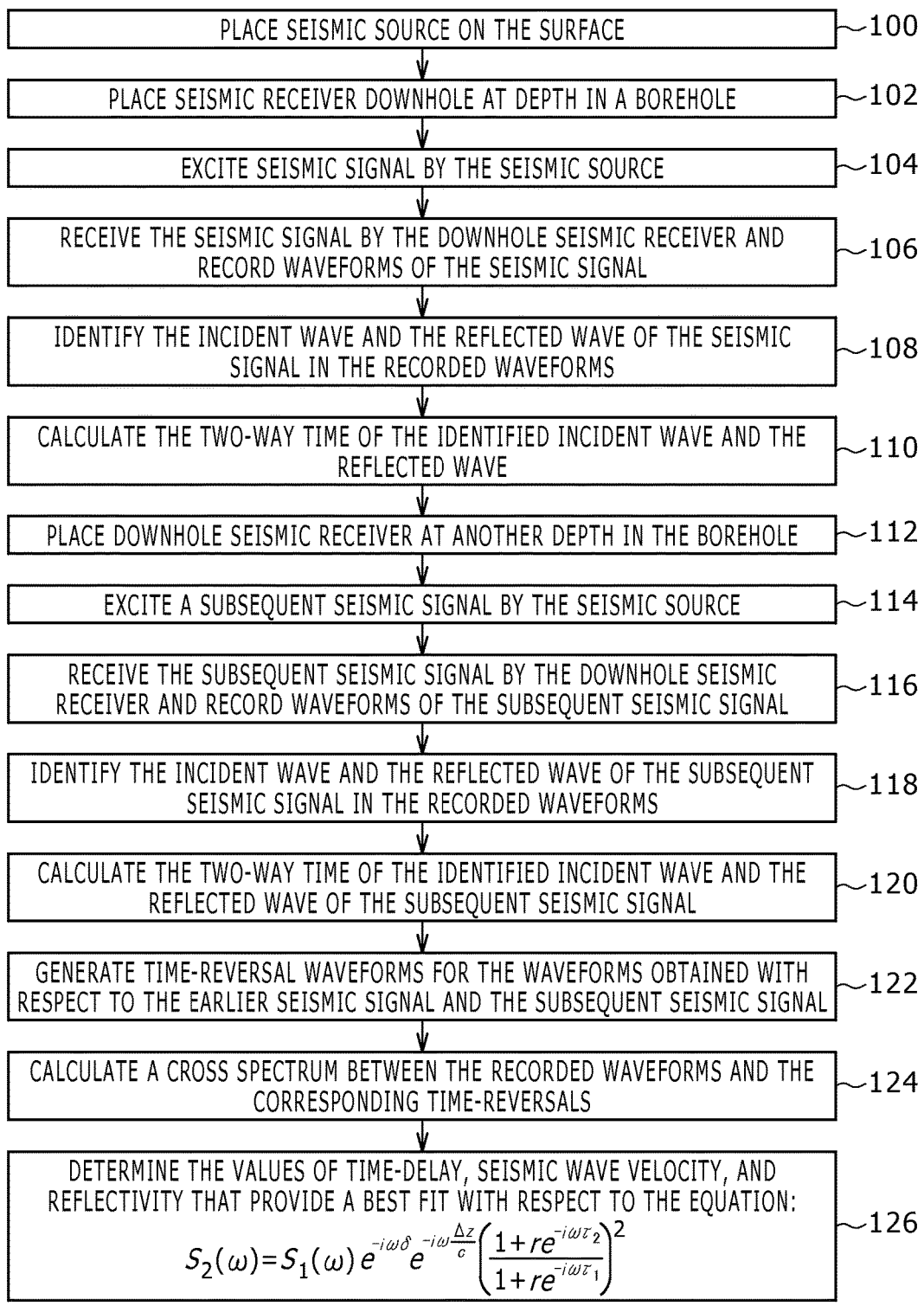
FIG. 5 is a flowchart illustrating another example of a procedure for determining inconsistency of the time-base of clocks for a corresponding seismic device, according to an embodiment of the disclosure.

An embodiment for determining the shift of the time-base employing the principles described above is illustrated in the flowchart of FIG. 5. In this example, at least one seismic source 36 is placed on the surface of the earth at a selected surface location, as represented by block 100. Additionally, at least one seismic receiver 26 is located downhole in borehole 34 at a desired depth, as represented by block 102. The seismic signal/wave 40 is then excited and output by the seismic source 36, as represented by block 104. The seismic signal 40 is received by the downhole seismic receiver 26 and the waveform of the seismic signal is recorded at, for example, control system 22, as represented by block 106. The incident wave 42 and the reflected wave 44 of the seismic signal are then identified in the recorded waveforms, as represented by block 108.

Similar to previous embodiments, the control system 22 and processor 24 may be used to process the data received from seismic receiver 26. In this embodiment, the processor 24 is employed to calculate the two-way time of the identified incident wave and identified reflected wave, as represented by block 110.

The seismic receiver 26 is then moved along the borehole 34 and placed at another depth, as represented by block 112. A subsequent seismic signal is excited and output by the seismic source 36, as represented by block 114. The subsequent seismic signal is received by the downhole seismic receiver 26 and the waveform of the subsequent seismic signal is recorded at, for example, control system 22, as represented by block 116. The incident wave 42 and the reflected wave 44 of the subsequent seismic signal are then identified in the recorded waveform, as represented by block 118.

The control system 22 and processor 24 may then be used to process the data received from seismic receiver 26 to calculate the two-way time of the identified incident wave and the identified reflected wave of the subsequent seismic signal, as represented by block 120. Based on this data, the control system 22 is able to generate time-reversal waveforms for the waveforms obtained with respect to the earlier seismic signal and the subsequent seismic signal, as represented by block 122. A cross spectrum between the recorded waveforms and the corresponding time-reversals is then calculated by, for example, control system 22, as represented by block 124. As described above and as represented by block 126, this enables determination of the values of time delay, seismic wave velocity, and reflectivity that provide a best fit with respect to the equation:

$$S_2(\omega) = S_1(\omega)e^{-i\omega\delta}e^{-i\omega\frac{\Delta z}{c}}\left(\frac{1+re^{-i\omega\tau_2}}{1+re^{-i\omega\tau_1}}\right)^2.$$

It should be noted that the embodiments and methodologies described above may be used with individual seismic receivers 26 placed in the borehole 34 or with a plurality of the seismic receivers 26 located in the borehole 34. For example, the seismic system 20 may comprise a seismic receiver placed at different depths or a plurality of seismic receivers 26 placed at fixed depths in borehole 34 during measurement of the seismic signals/waveforms. The methodology is effective in finding the drift of clocks in the plurality of fixed positions or fixed seismic receivers 26.

The methodologies also may be implemented in applications in which at least one seismic receiver 26 is located in the borehole 34 and at least one seismic receiver 26 is located at the surface. The time shift may be determined with respect to clocks for various combinations of the seismic receivers 26. Additionally, an individual seismic source or a plurality of seismic sources 36 may be positioned at surface locations, upper borehole locations, and/or at other suitable locations for exciting the seismic signal.

Depending on the application and environment, the methodologies may be implemented according to other forms. For example, an embodiment may comprise utilizing an image processing technique. The image processing technique is employed to examine breaks, e.g. disruptions, in symmetry between the incident wave 42 and the reflected wave 44.

Furthermore, the overall seismic system 20 may have a variety of constructions, components, and features selected according to the parameters of a given application. Additionally, changes and/or additions to the elements of the methodology may be selected for a given application to facilitate detection of time-base shifts during seismic exploration. The data obtained by seismic system 20 also may be adjusted, e.g. corrected, by control system 22 to compensate for the inconsistencies/time shifts which may occur between clocks of different seismic devices (e.g. seismic receivers) and/or between clocks of individual or plural seismic devices that are moved to different depths.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for use in seismic exploration, comprising:
   using a plurality of clocks in a plurality of receivers;
   outputting a seismic signal from a source;
   receiving the signal output by the source, identifying an incident wave and a reflected wave in the received signal; and
   detecting differences of a time base among the plurality of clocks based on the symmetry of propagation of the incident wave and the reflected wave of the seismic signal.

2. The method as recited in claim 1, further comprising placing at least one of the receivers at a surface of the earth.

3. The method as recited in claim 1, further comprising placing at least one of the receivers at a fixed depth beneath the surface of the earth.

4. The method as recited in claim 1, further comprising placing a plurality of the receivers at a fixed depth beneath the surface of the earth.

5. The method as recited in claim 1, further comprising detecting an arrival time of the incident wave and the reflected wave at each receiver, and comparing the respective mid-points between the arrival times of the incident waves and the reflected waves at each receiver.

6. The method as recited in claim 1, further comprising comparing an apparent slowness of the incident wave and the reflected wave.

7. The method as recited in claim 1, further comprising estimating a difference in the time-base among the plurality of clocks by calculating a cross-correlation of the waveforms and reversed waveforms.

8. The method as recited in claim 1, further comprising comparing a waveform image of the seismic signal and a time-reversal image of the seismic signal to determine breaks in symmetry.

9. A method for use in seismic exploration, comprising:
   outputting to a control system a seismic signal having an incident wave and a reflected wave, the seismic signal being received by at least one receiver;
   examining disruptions in a symmetry between the incident wave and the reflected wave; and
   using data obtained regarding the symmetry to determine a temporal change of the time base of a clock of the at least one receiver.

10. The method as recited in claim 9, further comprising tripping the at least one receiver downhole into a borehole to detect seismic signals at different depths.

11. The method as recited in claim 9, wherein the at least one receiver is placed at a fixed depth along a borehole.

12. The method as recited in claim 9, further comprising: detecting an arrival time of the incident wave and the reflected wave at each receiver of a plurality of receivers; and comparing the respective mid-points between the arrival times of the incident waves and the reflected waves at each receiver.

13. The method as recited in claim 9, further comprising comparing an apparent slowness of the incident wave and the reflected wave.

14. The method as recited in claim 9, further comprising estimating a difference in the time base by calculating a cross-correlation of waveforms and reversed waveforms of the seismic signal.

15. The method as recited in claim 9, further comprising comparing a waveform image and a time-reversal image to determine distortions in the symmetry.

16. A system, comprising:
a control system;
a plurality of seismic receivers operatively coupled to the control system, each seismic receiver having a clock; and
a seismic source operatively coupled with the control system, the seismic source outputting a signal detected by the plurality of seismic receivers, the detected signals each having an incident wave and a reflected wave, the control system being operated to process data received from the plurality of seismic receivers to detect differences of a time-base among the plurality of clocks based on the symmetry of propagation of the incident wave and the reflected wave.

17. The system as recited in claim 16, wherein the plurality of seismic receivers is positioned in a borehole.

18. The system as recited in claim 16, wherein the plurality of seismic receivers is positioned in a borehole at fixed depths.

19. The system as recited in claim 16, wherein at least one of the seismic receivers is positioned at a surface location.

20. The system as recited in claim 16, wherein the control system comprises a processor-based control system programmed to evaluate distortions in the symmetry of the propagation of the incident wave and the reflected wave to determine inconsistencies of the time base among clocks used in at least one seismic receiver positioned at a surface location and at least one seismic receiver positioned at a downhole location.

* * * * *